(12) United States Patent
Becker et al.

(10) Patent No.: US 8,376,615 B2
(45) Date of Patent: Feb. 19, 2013

(54) PIVOT BEARING

(75) Inventors: Klaus Becker, Herzogenaurach (DE);
Thomas Winkler, Sulzbach/Neuweiler (DE); Harald Vornehm, Ammerndorf (DE); Jan Georgi, Niederwerrn (DE); Thomas Goerwitz, Pinneberg (DE); Alexander Peter, Chemnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 597 days.

(21) Appl. No.: 12/333,479

(22) Filed: Dec. 12, 2008

(65) Prior Publication Data

US 2009/0154861 A1    Jun. 18, 2009

(30) Foreign Application Priority Data

Dec. 14, 2007 (DE) .......................... 10 2007 060 470

(51) Int. Cl.
*F16C 33/46* (2006.01)
(52) U.S. Cl. .......................................................... 384/2
(58) Field of Classification Search ................ 384/2, 49, 384/50, 51, 52, 55, 56, 57, 572
See application file for complete search history.

(56) References Cited

U.S. PATENT DOCUMENTS

| 1,471,254 | A | * | 10/1923 | Forbes | 384/49 |
| 3,514,166 | A | * | 5/1970 | Coley | 384/49 |
| 5,685,646 | A | * | 11/1997 | Gilbert | 384/49 |
| 6,027,250 | A | * | 2/2000 | Reubelt et al. | 384/2 |

* cited by examiner

*Primary Examiner* — William C Joyce
(74) *Attorney, Agent, or Firm* — Lucas & Mercanti, LLP; Klaus P. Stoffel

(57) ABSTRACT

A pivot bearing having a first bearing surface of hollow cylindrical design, at least in sections. Guided in the first bearing surface is a second bearing surface of hollow cylindrical design, at least in sections. Rolling bodies are arranged between the bearing surfaces. The pivot bearing also has a cage for guiding the rolling bodies, and a slide block to prevent the cage from slipping. A first grove is formed in the first bearing surface and a second grove is formed in the second bearing surface. The groves are inclined transversely with respect to the running direction of the rolling bodies. The opposite inclination of the groves has the result that, if the spacing between the bearing surfaces is neglected, the grooves intersect. The sliding block is guided between the grooves. The cage has a recess that holds the sliding block permitting cage control.

9 Claims, 3 Drawing Sheets

PIVOT BEARING

This application claims the priority of DE 10 2007 060 470.1 filed Dec. 14, 2007, and is incorporated by reference herein.

FIELD OF THE INVENTION

The present invention relates to a pivot bearing, such as is used for example as a swashplate pivot bearing in hydraulic axial piston engines.

BACKGROUND OF THE INVENTION

Pivot bearings are usually designed as segment rolling bearings in which it is necessary to take special precautions to ensure that the rolling bearings and a cage which guides the latter do not slide out of the pivot bearing.

DE 26 25 298 A1 presents a guide device for a cage of a segment rolling bearing. Said guide device has a spring element which, in the event of a deviation of the cage from its intended position, exerts a restoring force on the cage. This necessitates a support journal on the cage, though the arrangement of said support journal on the cage is difficult. The restoring forces which act on the support journal lead to fast wear of the cage and of the spring element.

DE 87 10 514 U1 describes a cage for a segment rolling bearing, which cage is designed as a solid cage and has at least one pin which runs parallel to rolling body pockets and which projects beyond the cage width. The pin functions as a support journal for a resilient guide clip. A high level of wear to the support journal occurs in said solution too.

DE 199 25 834 A1 describes a swashplate pivot bearing which has a cage with a support journal. The cage and the support journal are formed in one piece and are produced from a polymer material. The support journal is additionally surrounded by a metal ring. Said solution also requires a spring element which is subject to a high level of wear.

DE 10 2005 023 275 A1 presents a swashplate pivot bearing in which at least one cylindrical rolling body is in form-fitting engagement with the two bearing surfaces. In this way, it is obtained that the cage and the rolling bodies do not leave the optimum position even under the action of vibrations. The form-fitting action is obtained in that the rolling bodies and the two bearing surfaces are provided with a toothing, which however has the result that the production of the pivot bearing is very complex.

DE 34 42 391 C1 presents a tracker for a cage of a segment rolling bearing. Said tracker has a tracker mechanism which is guided by means of a guide member of a first guide and which is drive-connected to a driver of the cage. The first guide is formed by two guide grooves which are inclined in opposite directions and in particular equally with respect to the movement direction and which intersect one another. A disadvantage of said solution is that the guide device must be arranged on the outer sides of the segment rolling bearing, resulting in an increased spatial requirement.

SUMMARY OF THE INVENTION

It is the object of the present invention, proceeding from DE 34 42 391 C1, to provide a pivot bearing whose cage is prevented from slipping in the pivot bearing with little expenditure, and which does not have an increased spatial requirement for this purpose.

The pivot bearing according to the invention firstly comprises a first bearing surface which is of hollow cylindrical design at least in sections. Guided in said first bearing surface is a second bearing surface which is of cylindrical design at least in sections. The first bearing surface and the second bearing surface are pivotable relative to one another. Rolling bodies are arranged between the first bearing surface and the second bearing surface, which rolling bodies, in a running direction, follow a pivoting movement between the first bearing surface and the second bearing surface. In this respect, the pivot bearing according to the invention is comparable to a segment rolling bearing whose outer ring segment has the first bearing surface and whose inner ring segment has the second bearing surface. The pivot bearing according to the invention also comprises a cage for guiding the rolling bodies, and a means for cage control, which means serves to prevent slipping of the cage in the pivot bearing.

According to the invention, a first groove is formed in the first bearing surface and a second groove is formed in the second bearing surface. The first groove and the second groove are inclined transversely with respect to the running direction of the rolling bodies. Accordingly, the first groove and the second groove in each case have an alignment which neither points in the running direction of the rolling bodies nor is it perpendicular to a pivot axis of the pivot bearing. The first groove is inclined with respect to a plane which is perpendicular to the pivot axis, with the second groove being inclined with respect to said plane in precisely the opposite direction. The opposite inclination of the two grooves has the result that, if the spacing between the first bearing surface and the second bearing surface is neglected, said grooves intersect. If the first groove and the second groove are viewed from a viewing point on the center of the pivot axis, said grooves together form a cross.

According to the invention, a sliding block which forms the means for cage control is guided between the first groove and the second groove. The pivot bearing may for example be designed such that the sliding block slides along the two grooves, or may for example also be designed such that the sliding block rolls in the grooves. The cage has a recess in which the sliding block is held. This permits control of the cage. The position of the sliding block between the first bearing surface and the second bearing surface is determined by the first groove and the second groove. The sliding block is situated fundamentally at the point of intersection of the first groove and second groove. If the first bearing surface and the second bearing surface are pivoted with respect to one another, then the point of intersection moves, with the sliding block following the point of intersection. At the same time, the cage must follow the movement of the sliding block, since the sliding block is held by the cage. The cage is thereby prevented from sliding for example laterally out of the pivot bearing.

In the pivot bearing according to the invention, the cage is controlled so as to follow a pivoting movement between the first bearing surface and the second bearing surface by half. For example, if the second bearing surface is pivoted with respect to the first bearing surface by a certain pivot angle, the cage pivots by half of that pivot angle. The cage thereby moves in the running direction of the rolling bodies to the same extent as the rolling bodies follow the pivoting movement between the first bearing surface and the second bearing surface, as a result of which, friction between the cage and the rolling bodies is substantially prevented. The guidance of the sliding block in the first groove and the second groove limits the pivoting movement of the first bearing surface with respect to the second bearing surface. If the first bearing surface and the second bearing surface are pivoted with respect to one another, the point of intersection of the first groove and second groove moves for example from the center of the two grooves into in each case one of the two end regions of the two grooves. If the two grooves now intersect in their two end regions, then the sliding block abuts there, which simultaneously prevents a further pivoting movement between the first bearing surface and second bearing surface.

In a preferred embodiment of the pivot bearing according to the invention, the inclination of the first groove with respect to the running direction of the rolling bodies and the inclination of the second groove with respect to the running direction of the rolling bodies has in each case an angle of 30°±10°. Said dimension represents, for many applications, an optimum between the required axial extent of the grooves and the maximum pivot angle determined by the grooves. A smaller inclination permits a greater pivoting movement between the first bearing surface and the second bearing surface. It is fundamentally possible for the angle of inclination to be matched to the respective requirements.

The control of the cage permitted by the two grooves and the sliding block is preferably realized in multiple form in the pivot bearing. For this purpose, the first bearing surface has a plurality of first grooves and the second bearing surface has a plurality of second grooves. One of the plurality of sliding blocks is guided in each case between the first grooves and the second grooves, which sliding block is in turn held in one of the plurality of recesses in the cage. The multiple control of the cage serves to provide increased protection against the cage slipping in the pivot bearing.

In one preferred embodiment of the pivot bearing according to the invention, the cage is formed in the shape of an arc, in the end regions of which is arranged in each case one of the recesses for one of the sliding blocks. In said embodiment, the cage is controlled at least in its two end regions, such that highly reliable control of the cage is permitted even with two sliding blocks.

In one particular embodiment of the pivot bearing according to the invention, the sliding block has guide elements which are in engagement with corresponding guide elements of the cage. The sliding block may for example be formed with a cylindrical basic shape which has, on its casing, a guide groove which runs in a corresponding guide edge of the recess in the cage, as a result of which the sliding block cannot leave the cage. A sliding block of said type may for example be formed with a cylindrical journal on each side, which cylindrical journal is guided by the first groove or by the second groove.

In one preferred embodiment, the sliding block is formed by a ball. The ball rolls in a low-friction manner between the first groove and the second groove. Furthermore, the ball may be held in a simple manner by the cage.

The recess in the cage is preferably formed by a slot which is aligned transversely with respect to the movement direction of the rolling bodies. The slot makes it possible for the sliding block to follow the point of intersection, which moves in the direction of the pivot axis, of the two grooves.

In one particular embodiment of the pivot bearing according to the invention, the sliding block is held by a roller pocket. Said roller pocket is one of a plurality of roller pockets which are provided for guiding the rolling bodies. Said embodiment has the advantage that it does not require a special cage, but rather a cage according to the prior art is utilized for the solution according to the invention. In said embodiment, the ball has a diameter which is (for example approximately 1 mm) greater than the diameter of the rolling bodies which are formed by rollers or needles.

In one preferred embodiment, the pivot bearing is formed as an integral part of a swashplate-type axial piston engine. Said swashplate-type axial piston engine may be an axial piston engine or else an axial piston pump.

BRIEF DESCRIPTION OF THE DRAWINGS

Further advantages, details and refinements of the present invention can be gathered from the following description of a preferred embodiment with reference to the drawing, in which.

DETAILED DESCRIPTION OF THE INVENTION

Figure 1:
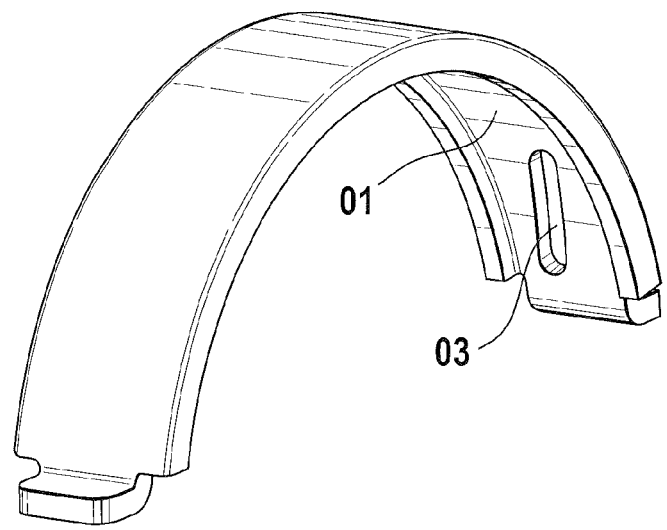
FIG. 1 shows an outer ring segment of a pivot bearing according to the invention.

FIG. 1 shows an outer ring segment of a pivot bearing according to the invention in a perspective view. The outer ring segment extends over an arc of almost 180°, such that said outer ring segment is of approximately semi-circular design. A first bearing surface 01 is formed on the inner side of the outer ring segment, on which first bearing surface 01 rolling bodies in the form of rollers 02 (shown in FIG. 4) can roll in the conventional way. The first bearing surface 01 has the shape of a segment of a hollow cylinder, as a result of which a counterpart, which is cylindrical at least in sections, can rotate in the first bearing surface 01.

The first bearing surface 01 has a first groove 03 which is inclined with respect to a running direction of the rolling bodies 02. The angle of inclination of the first groove 03 with respect to the running direction of the rolling bodies 02 is approximately 30°. The first groove 03 is arranged in a region of the first bearing surface 01 which the rollers 02 do not reach, or only partially reach, at a maximum pivot angle of the pivot bearing. Said region is an end region of the arc-shaped outer ring segment. The outer ring segment may, in other embodiments, comprise further first grooves, for example in the other end region of the outer ring segment.

Figure 2:
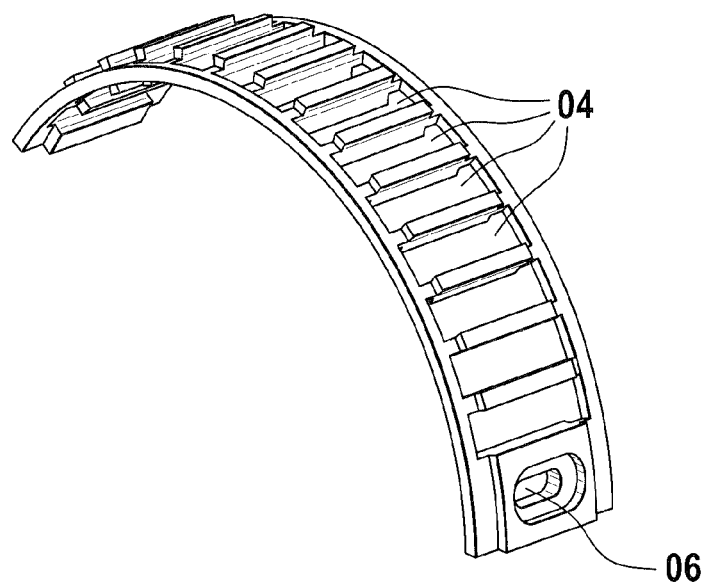
FIG. 2 shows a cage of the pivot bearing according to the invention.

FIG. 2 shows a cage, which is associated with the outer ring segment shown in FIG. 1, of the pivot bearing according to the invention. The cage has a plurality of roller pockets 04 in which the rollers 02 are guided. The cage also has a slot-shaped recess 06 which serves to hold a sliding block 07 (shown in FIG. 4). The slot-shaped recess 06 is aligned perpendicular to the running direction of the rollers 02.

Figure 3:
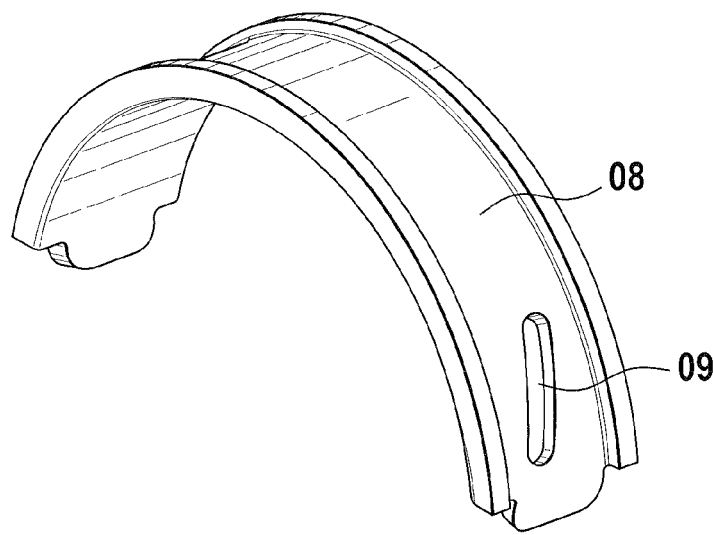
FIG. 3 shows an inner ring segment of the pivot bearing according to the invention.

FIG. 3 shows an inner ring segment, which is associated with the outer ring segment shown in FIG. 1, of the pivot bearing according to the invention. The inner ring segment has a second bearing surface 08 on which the rollers 02 can roll in the conventional way. The second bearing surface 08 has the shape of a segment of a cylinder, which corresponds to the shape of the first bearing surface 01. The rollers 02 roll in the conventional way between the first bearing surface 01 and the second bearing surface 08, with said rollers 02 being guided by the cage.

The second bearing surface 08 comprises a second groove 09. The second groove 09 has substantially the same dimensions as the first groove 03. The second groove 09 is likewise inclined with respect to the running direction of the rollers 02.

Said angle of inclination is equal to the angle of inclination of the first groove 03, but the inclination of the second groove 09 is in the opposite direction to the inclination of the first groove 03. Consequently, the inclinations of the first groove 03 and of the second groove 09 are aligned oppositely with respect to one another in relation to the running direction of the rolling bodies 02.

In an operationally ready state of the pivot bearing, the first groove 03 and the second groove 09 are aligned so as to intersect one another if the spacing between the first bearing surface 01 and the second bearing surface 08 is neglected. If the pivot bearing is in a central position, then the first groove 03 and the second groove 09 intersect in each case in their center. If the bearing is pivoted, then said point of intersection is moved in the direction of the ends of the first groove 03 and of the second groove 09. If the pivot bearing is pivoted to the maximum extent, then the first groove 03 and the second groove 09 intersect directly at their ends and describe a V-shape in the projection.

In alternative embodiments, the second bearing surface 09 may have further second grooves, with the second grooves corresponding in each case to corresponding first grooves in the first bearing surface 01.

Figure 4:
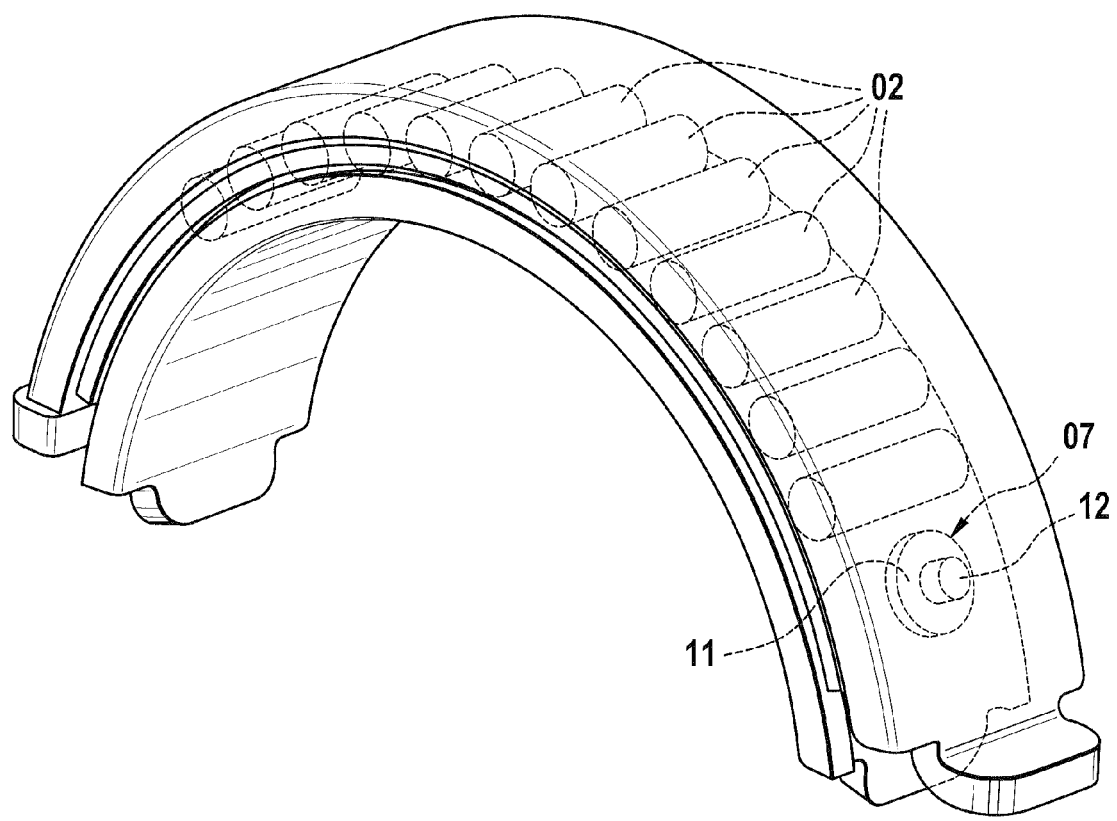
FIG. 4 shows the complete pivot bearing in a perspective view
Figure 5:
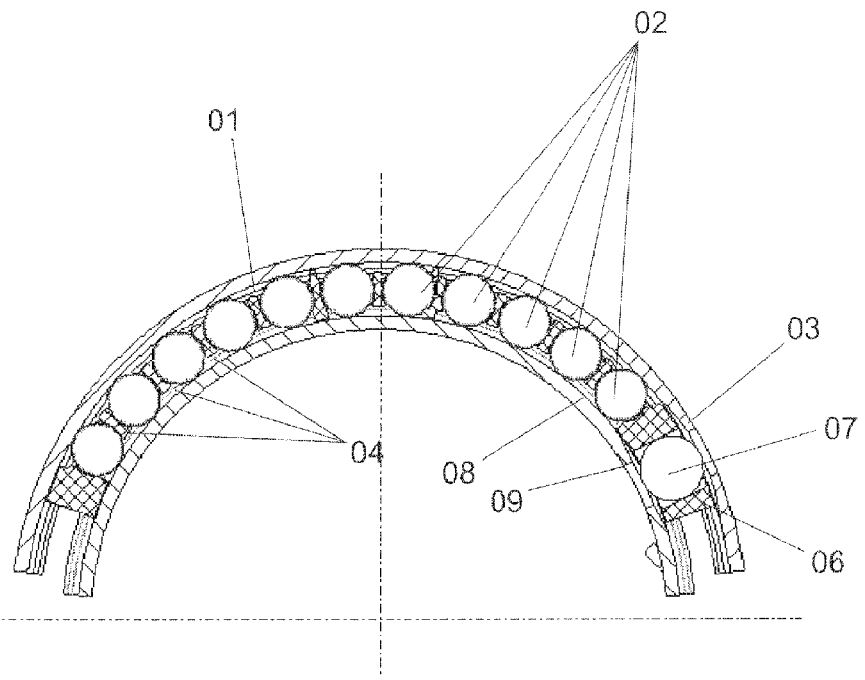
FIG. 5 shows a cross-sectional view of the pivot bearing.
Figure 6:
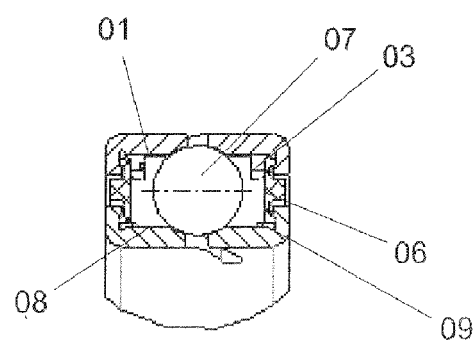
FIG. 6 shows sectional view of the pivot bearing taken from FIG. 5.

FIG. 4 shows the pivot bearing according to the invention in an assembled state and in a perspective view. The pivot bearing comprises the outer ring segment shown in FIG. 1, the cage illustrated in FIG. 2 and the inner ring segment shown in FIG. 3, and the rollers 02 and the sliding block 07. The sliding block 07 comprises a guide disk 11 which is held in the recess 06 (shown in FIG. 2) of the cage. The sliding block 07 also has a first guide journal 12 which is guided by the first groove 03 (shown in FIG. 1) of the outer ring segment. Opposite the first guide journal 12, the sliding block 07 has a second guide journal (hidden in the illustration) which is guided by the second groove 09 (shown in FIG. 3) of the inner ring segment.

If the pivot bearing according to the invention is situated, as shown in FIG. 4, in a central position, then the first groove 03 and the second groove 09 intersect in each case in their center. The sliding block 07 is positively guided by the first groove 03 (shown in FIG. 1) and by the second groove 09 (shown in FIG. 3), such that said sliding block 07 is situated fundamentally at the point of intersection of the first groove 03 and second groove 09. In the central position of the pivot bearing, the sliding block 07 is also situated in the center of the slot-shaped recess 06 (shown in FIG. 2) of the cage. If the outer ring segment and the inner ring segment are pivoted with respect to one another, then the point of intersection between the first groove 03 and the second groove 09 moves, with the sliding block 07 following the point of intersection. During the pivoting of the pivot bearing, the point of intersection between the first groove 03 and the second groove 09 moves perpendicular to the running direction of the rollers 02. Consequently, the sliding block 07 must perform a movement perpendicular to the running direction of the rollers 02, which is made possible by the slot-shaped design of the recess 06 in the cage without it being necessary for the cage to be displaced out of the pivot bearing for this purpose. At the same time, the guidance of the cage by the sliding block 07 in the recess 06 ensures that the cage cannot leave the region between the first bearing surface 01 and the second bearing surface 08.

The arrangement of the first groove 03 and the second groove 09 has the effect that, during a pivoting movement of the pivot bearing, the sliding block 07 moves to the same extent with respect to the first bearing surface 01 and with respect to the second bearing surface 08. During a pivoting movement of the bearing, the sliding block 07 follows the movement of the first bearing surface 01 by half and the movement of the second bearing surface 08 by half. The cage which is guided by the sliding block 07 moves in the same way, as a result of which the cage moves in the running direction of the rollers 02 to the same extent as the rollers 02 when the pivot bearing is pivoted. It is thereby ensured that the friction of the rollers 02 in the roller pockets 04 of the cage is minimal.

The pivoting movement of the pivot bearing is limited by the dimensions of the first groove 03 and of the second groove 09. The extent of the first groove 03 and of the second groove 09 in the running direction of the rollers 02 determines the maximum pivoting movement. If the pivot bearing is pivoted to the maximum extent, then the sliding block 07 abuts against the ends of the first groove 03 and of the second groove 09. It is hereby ensured that the pivot bearing is not pivoted to an excessive extent, which could result in the pivot bearing falling apart.

LIST OF REFERENCE SYMBOLS

01 First bearing surface
02 Rollers
03 First groove
04 Roller pockets
05 —
06 Recess
07 Sliding block
08 Second bearing surface
09 Second groove
10 —
11 Guide disk
12 First guide journal

The invention claimed is:

1. A pivot bearing, comprising:
an outer ring segment having a first bearing surface formed on an inner side of the outer ring segment, the first bearing surface is of hollow cylindrical design as viewed along an axis of rotation of the bearing and is shaped as a segment of a hollow cylinder;
an inner ring segment having a second bearing surface formed on an outer side of the inner ring segment, the second bearing surface is of hollow cylindrical design, as viewed along the axis of rotation of the bearing and is shaped as a segment of a hollow cylinder, and the outer ring segment and the inner ring segment are pivotable with respect to one another;
a cage, which is shaped as a segment of a cylinder, arranged between the outer ring segment and the inner ring segment, the cage having a plurality of pockets and a recess located at one end, of the cage segment;
rolling bodies arranged in the roller pockets of the cage between the first bearing surface and the second bearing surface, the rolling bodies each having an axis of rotation that is parallel to the axis of rotation of the bearing, and the rolling bodies, in a running direction, follow a pivoting movement between the first bearing surface and the second bearing surface; and
a sliding block arranged in the recess of the cage to provide cage control so as to prevent slipping of the cage in the pivot bearing;
wherein the first bearing surface has a first elongated through-hole only in an end region of the first bearing surface and the second bearing surface has a second elongated through-hole only in an end region of the second bearing surface, the first elongated through-hole and the second elongated through-hole are inclined transversely with respect to the running direction of the rolling bodies and are aligned so as to intersect each other, and wherein the sliding block is guided between the first elongated through-hole and the second elongated through-hole.

2. The pivot bearing according to claim 1, wherein an inclination of the first elongated through-hole with respect to the running direction of the rolling bodies and the inclination of the second elongated through-hole with respect to the running direction of the rolling bodies have, in each case, an angle of 30°±10°.

3. The pivot bearing according to claim 1, wherein the sliding block has guide elements which are in engagement with corresponding guide elements of the cage.

4. The pivot bearing according to claim 1, wherein the sliding block is a ball.

5. The pivot bearing according to claim 1, wherein the recess in the cage is formed by a slot which is aligned transversely with respect to the rolling bodies direction of movement.

6. The pivot bearing according to claim 1, wherein the sliding block is a ball and a diameter of the rolling bodies is approximately 1 mm smaller than a diameter of the ball.

7. The pivot bearing according to claim 1, wherein the pivot bearing is formed as an integral part of a swashplate axial piston engine.

8. The pivot bearing according to claim 1, wherein the cage has only a single row of pockets for the rolling bodies.

9. The pivot bearing according to claim 1, wherein only a single row of rolling bodies are arranged in the cage.

* * * * *